United States Patent [19]

Shattuck et al.

[11] Patent Number: 5,022,267
[45] Date of Patent: Jun. 11, 1991

[54] BEARING ROLLER GAUGE

[75] Inventors: Charles W. Shattuck, Goshen; Joseph J. Lestinsky, Torrington; Michael W. Gerardi, New Hartford, all of Conn.

[73] Assignee: The Torrington Company, Torrington, Conn.

[21] Appl. No.: 465,288

[22] Filed: Jan. 16, 1990

[51] Int. Cl.$^5$ .................. G01M 13/04; G01B 5/28
[52] U.S. Cl. ........................... 73/593; 33/784; 33/783; 33/803; 73/660
[58] Field of Search ............ 73/593, 660, 659; 33/501.02, 517, 549, 550, 784, 803, 783

[56] References Cited

U.S. PATENT DOCUMENTS

| | | | |
|---|---|---|---|
| 2,997,791 | 8/1961 | Morrison | 33/517 |
| 3,486,616 | 12/1969 | Brany et al. | 73/593 |
| 3,634,759 | 1/1972 | Tokorozawa et al. | 73/659 |
| 3,699,806 | 10/1972 | Weichbrodt | 73/593 |
| 3,745,815 | 7/1973 | Betone et al. | 73/593 |
| 3,795,055 | 3/1974 | Zucco | 33/550 |

FOREIGN PATENT DOCUMENTS

| | | | |
|---|---|---|---|
| 0071905 | 4/1985 | Japan | 33/783 |
| 1183756 | 3/1970 | United Kingdom | 33/550 |
| 2057688 | 4/1981 | United Kingdom | 33/784 |

Primary Examiner—Hezron E. Williams
Assistant Examiner—Rose M. Finley
Attorney, Agent, or Firm—Michael H. Minns

[57] ABSTRACT

The diametral variations around the circumference of a bearing roller are measured by mechanical-to-electrical transducers which convert the diametral variations into electrical signals which are functions of the variations. The frequencies of the electric signals are converted into electric spikes which are proportional to the actual effect on roller noise of the frequency represented by each spike. The spikes are electrically added and a print is made of a value which is proportional to the expected noise the roller will produce when used in a roller bearing.

6 Claims, 4 Drawing Sheets

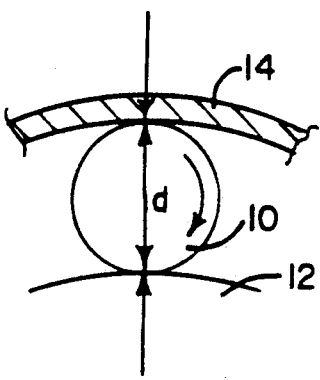
FIG. 1
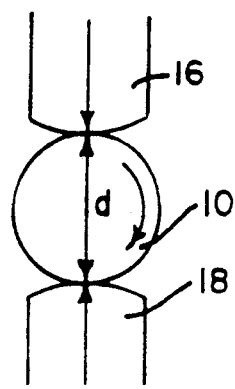
FIG. 2
FIG. 3
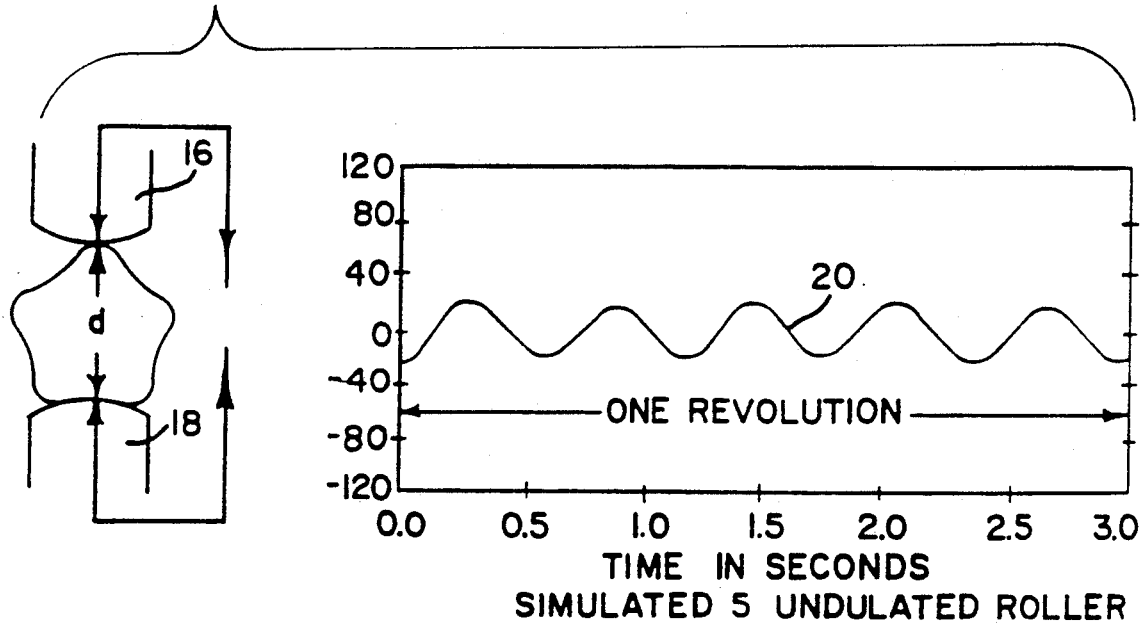
TIME IN SECONDS
SIMULATED 5 UNDULATED ROLLER
FIG. 4
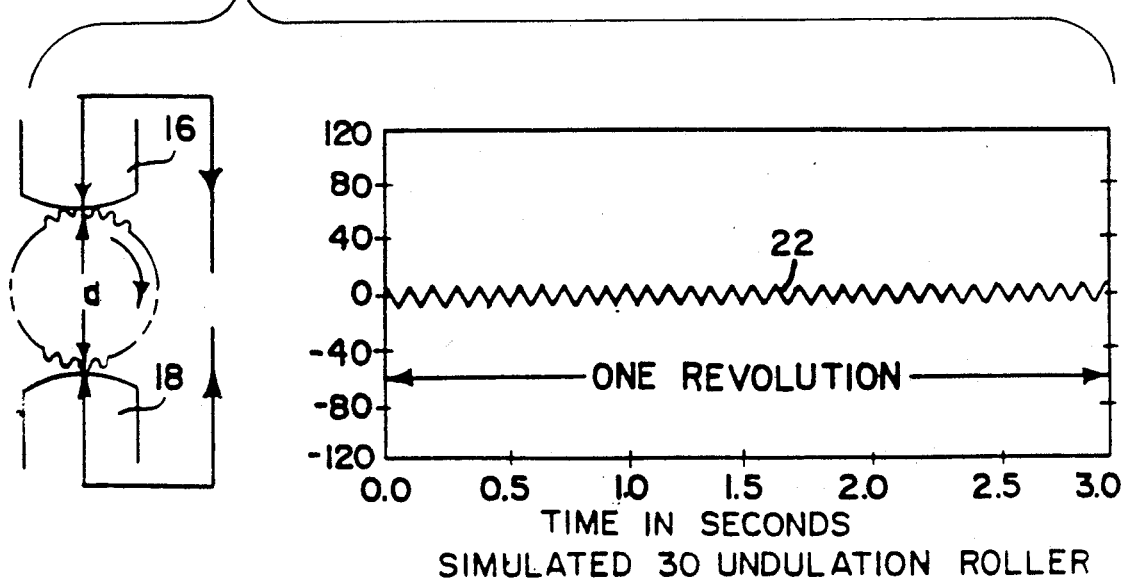
TIME IN SECONDS
SIMULATED 30 UNDULATION ROLLER

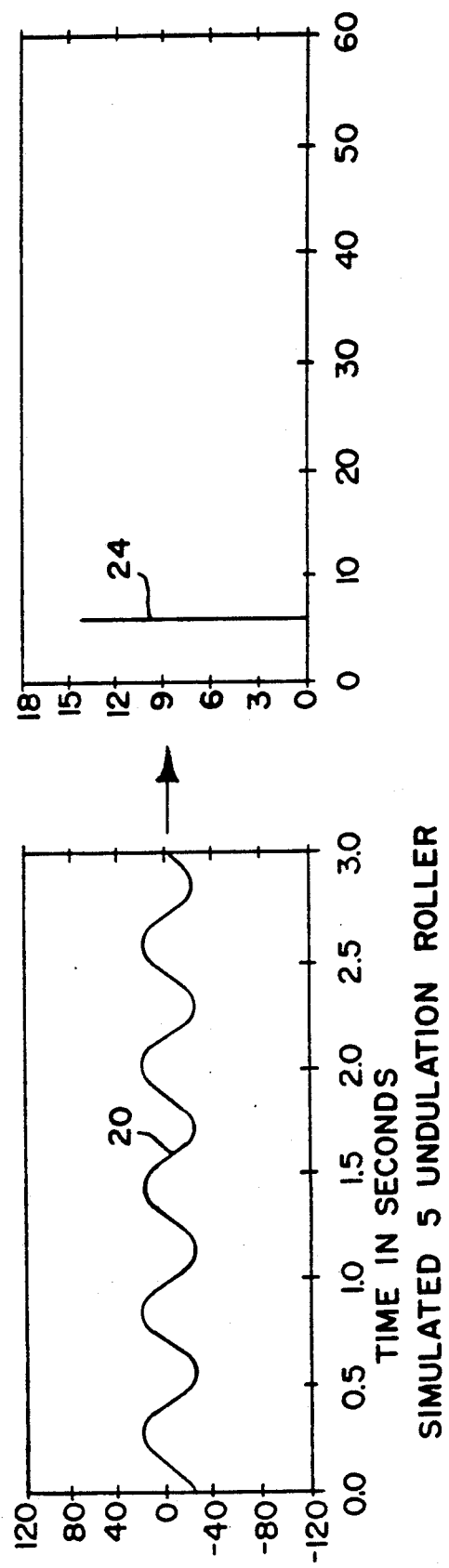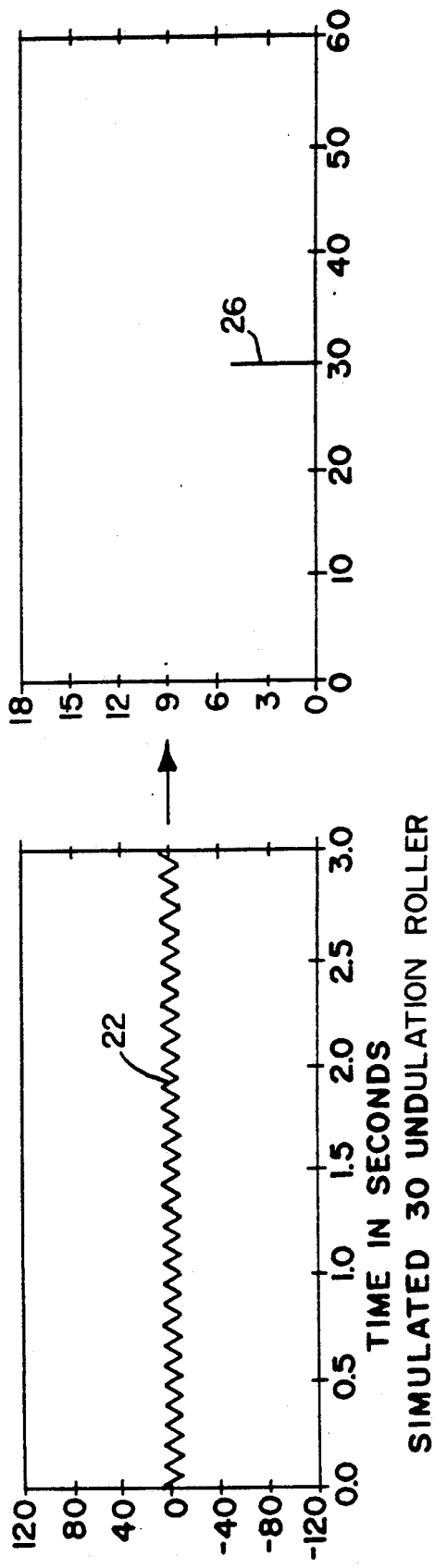

BEARING ROLLER GAUGE

This invention relates to roller bearings. More particularly, this invention is a method and apparatus for measuring the diametral variations around the circumference of a roller.

One of the steps used to manufacture rollers for roller bearings is to grind the rollers in machines known as centerless grinders. This grinding operation produces small periodic undulations that appear on the surface of the rollers. These undulations are commonly called "grinder chatter" and appear between 12 and 60 times around the circumference of the roller. The most common form of chatter occurs toward the middle of this range, between 20 and 40 undulations.

Conventional roller roundness measuring equipment is not constructed to detect undulations due to grind chatter. The conventional equipment does a reasonable job of measuring lobing, that is, less than 12 undulations around the circumference, but in most cases lobing is less a noise producer than the chatter undulations.

The U.S. Pat. No. 3,745,815 granted to Bentone et al, July 17, 1973 and entitled "DEVICE FOR EVALUATING THE VIBRATIONS OF A REVOLVING MEMBER", discloses a device that mounts a ball bearing on a rotating spindle in order to evaluate its vibrations. Bentone, however, does not disclose or suggest an apparatus or method to measure variations in the diameter of a roller. The U.S. Pat. No. 3,795,055 granted to Zucco, Mar. 5, 1974 and entitled "APPARATUS FOR DIMENSIONAL TESTING OF NOMINALLY CYLINDRICAL WORKPIECES" discloses an apparatus for measuring the diameter of a cylindrical workpiece utilizing two opposing transducers. The device of Zucco, however, does not rotate the tested object on a spindle but rather only turns it 180° about the axis of a "V" support.

The roller gauge of this invention is constructed to not only detect and measure chatter, but also to make an accurate prediction of how much noise energy the roller is likely to generate in operation.

Briefly described, the roller gauge comprises a means for rotating the roller. Mechanical-to-electrical transducer means convert the diametral variations of the roller into electrical signals which are a function of the diametral variations. An electric signal conversion system converts the electrical signals from the transducer into a meaningful indication of the diametral variation of the roller Our new method of indicating the diametral variations of rollers comprises the steps of rotating the rollers, electromechanically converting the diametral variations around the circumference of the roller into electrical signals which are a function of the diametral variations, and converting the electrical signals into a meaningful indication of the diametral variations of the roller.

The invention as well as its many advantages may be further understood by reference to the following detailed description and drawings in which:

FIG. 1 is a fragmentary schematic representation of a roller in a bearing useful to explain the invention;

FIG. 2 is a schematic representation of the roller to be tested and the transducers for measuring the variations in the diameter of the roller useful to explain the invention;

FIG. 3 is a schematic of the step of measuring the diametral variation around the circumference of a roller having five undulations around its circumference and converting the diametral variations of the roller into electrical signals which are a function of the diametral variations;

FIG. 4 is a schematic of the step of measuring the diametral variation around the circumference of a roller having thirty undulations around its circumference and converting the diametral variations of the roller into electrical signals which are a function of the diametral variations;

FIG. 5 is a schematic of the step of converting the electrical signals of FIG. 3 into a spike indicating the frequency and the average amplitude of the frequency of the electrical signals of FIG. 3;

FIG. 6 is a schematic of the step of converting the electrical signals of FIG. 4 into a spike indicating the frequency and the average amplitude of the frequency of the electrical signals of FIG. 4;

In the various figures, like parts are referred to by like numbers.

Figure 7:
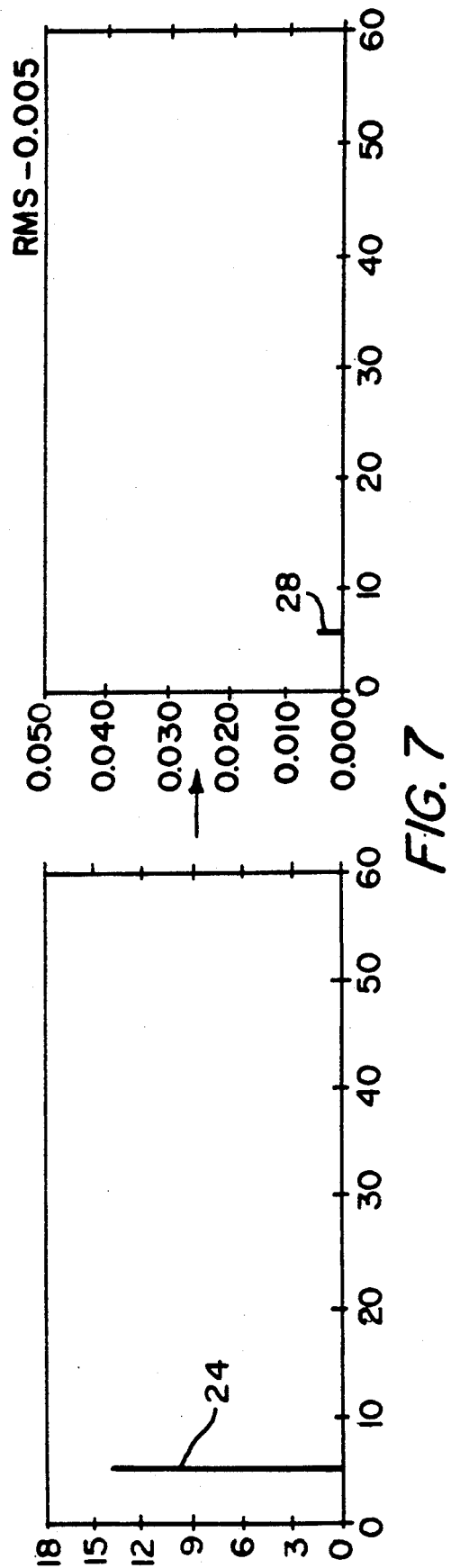
FIG. 7 is a schematic showing the conversion of the spike of FIG. 5 into a reduced spike which is proportional to the actual effect of the frequency on roller noise.

Referring to the drawings and more particularly to FIG. 1 and FIG. 2, conventional roundness equipment measures the radial deviation around the circumference of the roller. While this may provide some useful information, we have found that measuring the diametral variation is a more accurate way to look at the surface of a roller for noise producing defects. The reason for this is that when the roller bearing is operated it only "sees" from a diametral standpoint. The similarity between how the bearing and the diametral gauge each measure the roller diameter is illustrated in FIG. 1 and FIG. 2. In FIG. 1, the roller 10 rolls within the annulus between a rotatable shaft 12 and an outer race 14. In FIG. 2, the gauge includes an upper transducer 16 and a lower transducer 18 which measures the diameter of the roller 10. Thus, FIG. 1 and FIG. 2 illustrate the similarity between how the bearing and the diametral gauge each measure the roller diameter.

As shown in FIG. 3 and FIG. 4, the physical measurement of the roller diameter in the gauge results in an electrical signal which may be fed to, for example, a lineal variable distance transducer. The mechanical-to-electrical transducers 16 and 18 convert the physical measurement into electrical signals which are a function of the diametral variation. FIG. 3 and FIG. 4 are examples of what the wave forms 20 and 22 would look like for rollers that have 5 lobes and 30 chatter undulations, respectively.

The amplitude of the wave formed is proportional to the roller diameter variations detected by the transducers. A perfectly round roller would have no diametral variations and, therefore, the wave form would show a straight line at the zero amplitude level. In actual practice, even very good quality rollers have some diametral variation which will be detected by the gauge.

The wave form information shown in FIG. 3 and FIG. 4 is useful for giving a visual indication of the diameter variation. In simple cases, we can also use it to count the number of undulations and to estimate their average amplitude. To improve accuracy, however, we take the wave form signals shown in FIG. 3 and FIG. 4 and perform a frequency analysis on them. This is really the only way that complex real-world roller shapes can be quickly reduced to their component frequencies. The frequency analysis of the roller examples shown in FIG. 3 and FIG. 4 are shown in FIG. 5 and FIG. 6, respectively.

Each of the components, or "spikes", 24 and 26 give a simplified interpretation of the wave form from which it was derived. Using a single vertical line, these spikes can convey both the frequency and the average amplitude for their respective wave form. Because of their complexity, real-world roller signals may have many more frequency spikes. However, the principle of frequency analysis is always the same as these simple cases.

At this point, we now have a simplified frequency analysis of a more complex wave form, but we still have to perform some additional processing of the information. The reason for this is due to the fact that the frequency of the wave form has a great deal to do with how noisy the roller will be in the bearing. All wave form frequencies are not created equal, where roller noise is concerned. The lower frequencies in the 12 to 60 undulations range do not contribute a great deal toward roller noise. The frequencies become more important as we move to the higher frequencies. In the upper half of the frequency range (30 to 60 undulations), any frequency spike at all seems to cause some roller noise.

Figure 8:
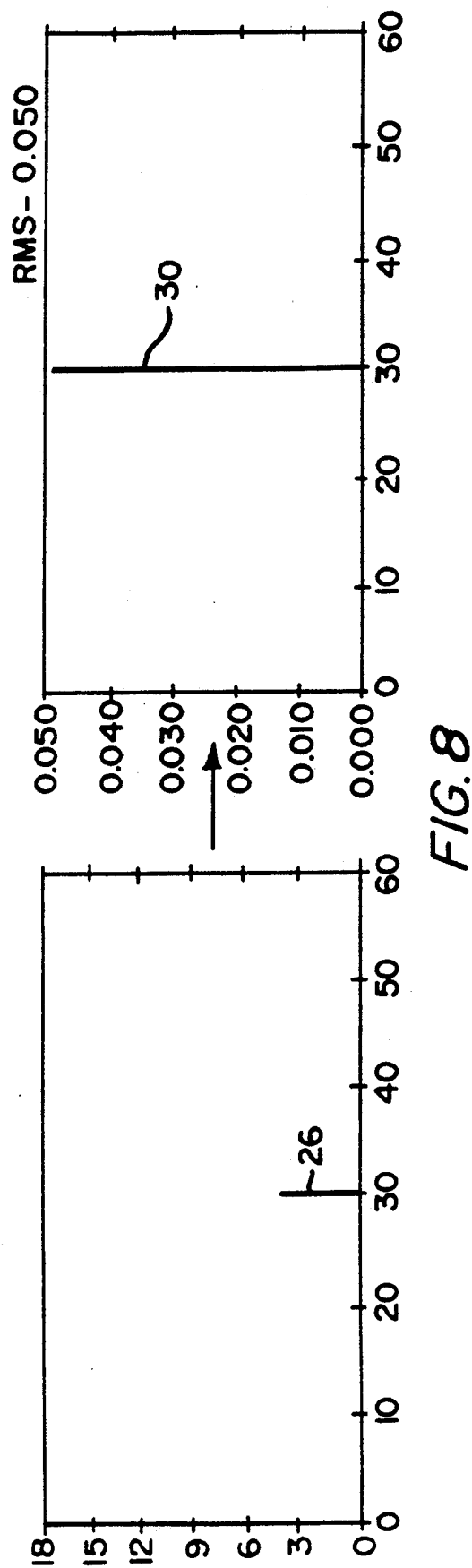
FIG. 8 is a schematic showing the conversion of the spike of FIG. 6 into a spike of greater amplitude and proportional to its actual effect on roller noise.

In order to resolve this frequency inequality, we electronically convert the frequency plot so that the height of the spike 24 shown in FIG. 7 is reduced to the spike 28 of FIG. 7 while the height of the spike 26 in FIG. 8 is enlarged to the spike 30 in FIG. 8. In the resulting frequency plot, the spikes are always shown proportional to their actual effect on roller noise. The two spikes are now shown in their proper relative height as they effect the roller noise levels. Note that spike 30 now appears much higher than the spike 28. This is as it should be to show their relative contribution to noise.

The final step in the roller chatter measurement is to take the converted frequency plot and reduce it down to a single meaningful number. The spikes of all the frequencies are electronically added and a total RMS value for that particular roller is printed. This appears in the upper right-hand corner of the converted frequency plots of FIG. 7 and FIG. 8. This value can then be compared to some specified level for the roller being evaluated. It can be seen that for our two hypothetical rollers, the one that has the five lobes (but no chatter) came in with a very low reading of 0.005 RMS, while the roller with chatter (but no lobing) was an order of magnitude higher at 0.050 RMS. In looking at real-world rollers, it is seldom a case of having only chatter or only lobing, since usually both are present to some degree. The more complex the roller geometry, the more useful this gauge becomes in sorting out what is important with regard to noise.

Figure 9:
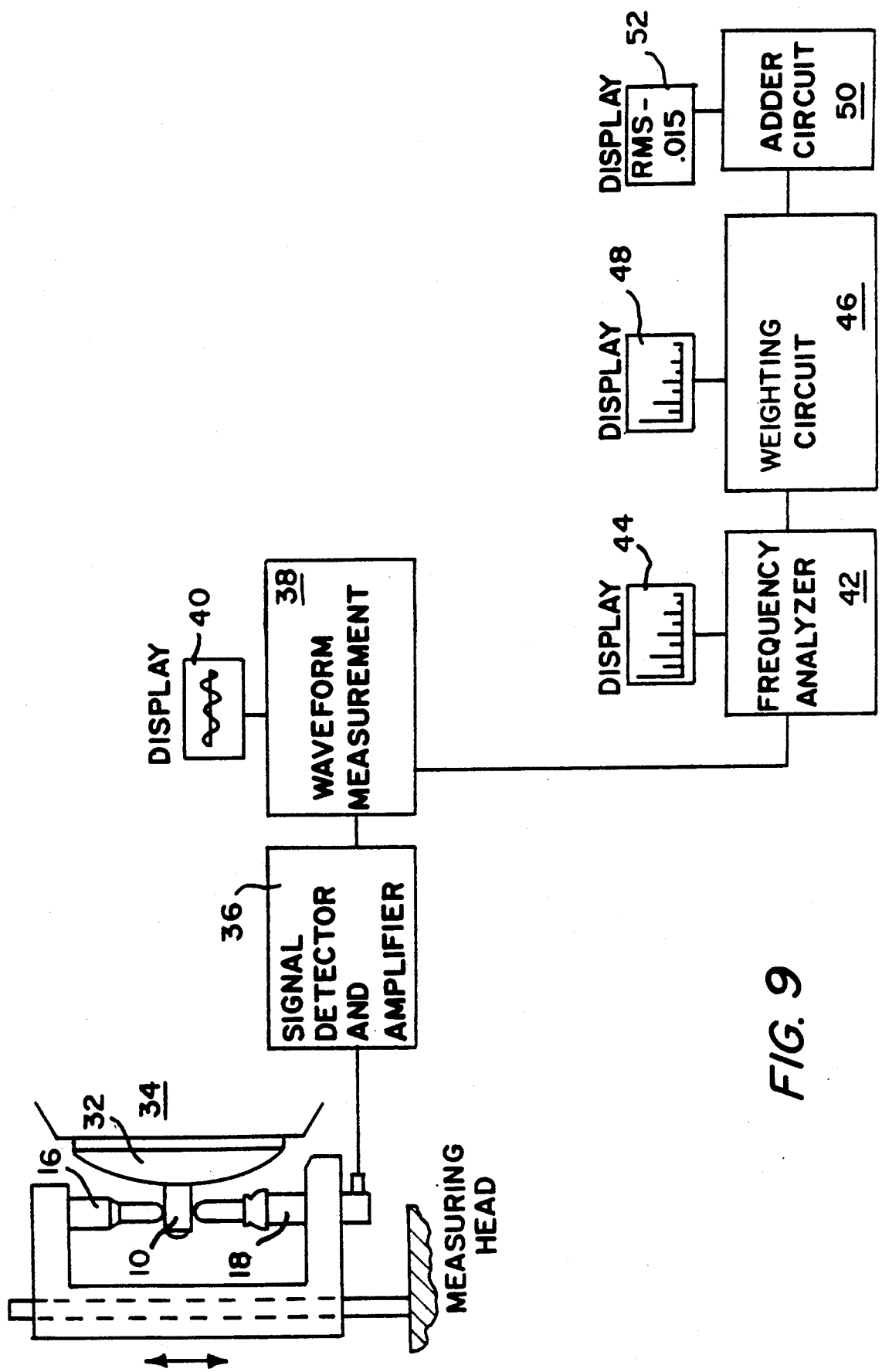
FIG. 9 is a block diagram of the electronic circuit of the invention.

Referring to FIG. 9, the roller 10 is mounted on the spindle 32 which is rotatable within housing 34. The diametral variations in the roller around its circumference are converted into wave forms such as shown in FIG. 3 and FIG. 4 but having many more frequencies than shown in FIG. 3 and FIG. 4 and fed to the SIGNAL DETECTOR AND AMPLIFIER 36. From the SIGNAL DETECTOR AND AMPLIFIER 36, the wave form is fed to the WAVE FORM MEASUREMENT CIRCUIT 38 and displayed on a display 40. The signals are then fed to the FREQUENCY ANALYZER 42 where the complex frequencies from the WAVE FORM MEASUREMENT CIRCUIT 38 are converted into spikes similar to the spikes shown in FIG. 5 and FIG. 6 and displayed on the display 44. The spikes from the FREQUENCY ANALYZER 42 are then fed to the WEIGHTING CIRCUIT 46 where the spikes from the FREQUENCY ANALYZER 42 are converted into a plurality of spikes like the spikes 28 and 30 of FIG. 7 and FIG. 8, respectively, which are proportional to the actual effect on roller noise of the frequency represented by the spike. These spikes are displayed in display 48. The spikes from the WEIGHTING CIRCUIT 46 are then fed to the ADDER CIRCUIT 50 where all the spikes are electrically summed and a print of the RMS value is displayed on display 52.

We claim:

1. A roller gauge comprising:
   means for rotating a roller;
   mechanical-to-electrical transducer means for measuring the diametral variation around the circumference of the roller and converting the diametral variations of the roller into electrical signals which are a function of said diametral variation; and
   an electrical signal conversion system for converting the electrical signals from said mechanical-to-electrical transducer means into a meaningful indication of the diametral variations of the roller, the electrical signal conversion system having a frequency analyzer for dividing the electrical signals from said mechanical-to-electrical transducer means into component frequencies and having
   a weighting circuit which receives the signals from the frequency analyzer and weights the received signals such that the weighted component frequencies are proportional to the predicted effect on roller noise of the component frequencies.

2. A roller gauge in accordance with claim 1 wherein:
   the electrical signal conversion system has an adder circuit which receives the weighted component frequencies from the weighting circuit, electrically sums all the weighted component frequencies, and displays a total meaningful value.

3. A method of indicating diametral variations of rollers to be used in roller bearings comprising the steps of:
   rotating the roller;
   using a mechanical-to-electrical transducer to convert the diametral variations around the circumference of the roller into electrical signals which are a function of the diametral variations; and
   converting the electrical signals into a meaningful indication of the diametral variations of the roller, including the step of converting the electrical signals which are a function of the diametral variations into component frequencies; and
   weighting the component frequencies to produce weighted component frequencies which are proportional to the predicted effect on roller noise of the component frequencies.

4. A method in accordance with claim 3 wherein:
   the converting of the electrical signals into a meaningful indication of the diametral variations of the roller includes the step of adding all the weighted component frequencies and displaying a total meaningful value.

5. A method for predicting noise of a bearing roller comprising the steps of:
rotating the roller;
measuring the diametral variations of the roller;
converting the diametral variations into electrical signals which are a function of diametral variation;
converting said electrical signals which are a function of diametral variation into component frequencies; and
weighting each of said component frequencies whereby the weighted component frequency is proportional to the predicted effect on roller noise of that component frequency.

6. A method in accordance with claim 5 further comprising the step of:
adding all the weighted component frequencies to obtain a value proportional to total predicted roller noise.

* * * * *